US008083138B2

(12) United States Patent
Henry

(10) Patent No.: US 8,083,138 B2
(45) Date of Patent: Dec. 27, 2011

(54) MULTI-HEAD POINT OF SALE TERMINAL

(75) Inventor: Chris Henry, Sydney (AU)

(73) Assignee: Hypercom Corporation, Scottsdale, AZ (US)

( * ) Notice: Subject to any disclaimer, the term of this patent is extended or adjusted under 35 U.S.C. 154(b) by 0 days.

(21) Appl. No.: 12/966,496

(22) Filed: Dec. 13, 2010

(65) Prior Publication Data

US 2011/0079645 A1   Apr. 7, 2011

Related U.S. Application Data

(63) Continuation of application No. 11/100,060, filed on Apr. 6, 2005, now Pat. No. 7,850,074.

(51) Int. Cl.
*G06K 5/00* (2006.01)
(52) U.S. Cl. ........................ 235/380; 235/492
(58) Field of Classification Search ................ 235/380, 235/382, 385, 487, 492
See application file for complete search history.

(56) References Cited

U.S. PATENT DOCUMENTS

| 4,213,039 | A | 7/1980 | Schasser |
| 5,945,654 | A | 8/1999 | Huang et al. |
| 7,850,074 | B2 * | 12/2010 | Henry ........................ 235/380 |
| 2004/0011877 | A1 | 1/2004 | Reppermund |
| 2004/0173679 | A1 * | 9/2004 | Oki et al. ..................... 235/449 |
| 2006/0163353 | A1 | 7/2006 | Moulette et al. |

OTHER PUBLICATIONS

International Search Report and Written Opinion for PCT/US2006/012514 dated Sep. 15, 2006, 14 pages.
International Preliminary Report on Patentability for PCT/US2006/012514 dated Oct. 9, 2007, 7 pages.
Card Reader, Anonymous, Research Disclosure, Mason Publications, Hampshire GB vol. 286 No. 52 Feb. 1988. ISSN: 0374-4353 the whole document.
Market Pulse, Hypercom orders OTI contactless reader solutions, Mar. 3, 2005, 1 page.
Hypercom Corporation: "Optimum L4100" May 2004, 2 pages.
Mosaic Software Newsletter, Aug. 2004, 2 pages.
Hypercom Corporation—"Speeding the Checkout Line, Boosting the Profit Line", Mar. 16, 2005, 4 pages.
Hypercom Corporation—ICE 6000 Plus [online], 2 pages.
Hypercom Corporation—Biopin [online] Apr. 2002, 17 pages.
Non Final Office Action dated Mar. 28, 2007, U.S. Appl. No. 11/100,060 6 pages.
Final Office Action dated Sep. 14, 2007, U.S. Appl. No. 11/100,060 2008, 13 pages.
Non Final Office Action dated Jun. 13, 2008 U.S. Appl. No. 11/100,060 2008, 13 pages.
Non Final Office Action dated Dec. 28, 2009, U.S. Appl. No. 11/100,060 2008, 12 pages.
Final Office Action dated Apr. 15, 2009, U.S. Appl. No. 11/100,060, 13 pages.
Notice of Allowance dated Aug. 18, 2010, U.S. Appl. No. 11/100,060, 12 pages.

* cited by examiner

*Primary Examiner* — Daniel St. Cyr
(74) *Attorney, Agent, or Firm* — Snell & Wilmer L.L.P.

(57) ABSTRACT

The invention provides increased convenience through use of multiple opposed magnetic stripe reader heads within a POS terminal card reader track. In one embodiment, the various opposed heads are offset along the card reader track. The POS terminal also accommodates smart card and contactless instrument readers and includes features for electronic signature capture, user display interaction, multi-tasking capabilities, check reading and age and identity verification.

14 Claims, 3 Drawing Sheets

MULTI-HEAD POINT OF SALE TERMINAL

CROSS-REFERENCE TO RELATED APPLICATIONS

This application is a continuation of and claims priority to U.S. patent application Ser. No. 11/100,060 filed Apr. 6, 2005, and issued as U.S. Pat. No. 7,850,074 on Dec. 14, 2010.

FIELD OF INVENTION

The present invention relates, generally, to a point of sale ("POS") terminal capable of bi-directional reading of magnetic cards without regard to card orientation, and more particularly to a POS terminal having multiple opposed magnetic stripe reader heads.

BACKGROUND OF THE INVENTION

Point of sale ("POS") terminals enable convenient electronic payment for many products and services. Consumers holding cards associated with a charge, credit, debit, or loyalty account may pay for a purchase simply by entering a card or card information directly into the POS terminal. The demonstrated success of "pay at the pump" terminals is just one example of the popular acceptance of and preference for the convenience of POS terminal transactions. Smart card and contactless card readers provide additional convenience at such POS terminals.

Presently known POS terminals typically include, inter alia, a magnetic stripe reader, a keypad for entry of a personal identification number ("PIN"), and a user display. Conventional POS terminals communicate with a central computer to authorize and settle sales transactions. Terminals often include peripheral devices such as printers, bar code readers or PIN entry pads. Use of such known POS terminals typically requires that the user orient the magnetic stripe on a card to correspond to the position of the magnetic stripe reader head within the card track or slot on the terminal. Many models also require and supposedly instruct that the card be passed through the track in a particular direction in addition to requiring a particular orientation of the card. Accordingly, consumers or other users of such terminals often fail to properly orient or direct the card within the card track. Improper orientation or direction of a card may result in confusion and uncertainty, leading to failed transactions or redundant transactions as information is resubmitted. This problem is compounded by the fact that different terminals employ different card reader configurations and instructions, relying on imprecise arrows, pictures, and written instructions to guide the user as to card orientation and direction. This problem has long been a source of delay, inconvenience and frustration for consumers and merchants alike.

Accordingly, there is a need for a POS terminal that accommodates multiple card orientations and bi-directional magnetic stripe card reading and that overcomes other shortcomings of the prior art.

SUMMARY OF THE INVENTION

The present invention facilitates convenient POS terminal transactions by providing a dual head magnetic stripe reader for reading either side of a transaction card passed through a card reader in either direction. By including at least two heads in a swipe-style card reader, a POS terminal accommodates reading of cards in multiple orientations or in any given orientation. In a swipe-style reader, the magnetic stripe on a card may face either sidewall of a card track and may be passed through the track in either direction. Additional heads may be used on a feed-return swipe or ATM style POS terminal to accept a card in any orientation. For example, use of four reader heads in such terminals accommodates reading of a magnetic card stripe in any of four possible orientations, i.e. allowing for insertion of either end of a card with either face of the card facing a particular direction.

Offsetting the reader heads along the card track reduces or prevents field interference and/or binding or chatter of the card within the track due to interference with track and head components or contours. Supplemental transaction instrument readers such as smart card readers or contactless readers provide additional data extraction functionality to the multi-head magnetic stripe reader POS terminal.

Other features of various embodiments of the present invention may include or support electronic signature capture, an interactive screen, multi-tasking capabilities, age and identity verification, program or account enrollment, account status and balance inquiries, payroll and government check reading, and medical or other insurance claim transactions. The present invention may be used with various types of accounts including credit, debit, charge, and loyalty programs and may also accommodate payment by promotion or gift cards, prepaid cards, payroll checks and government checks.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

DETAILED DESCRIPTION

Figure 1:
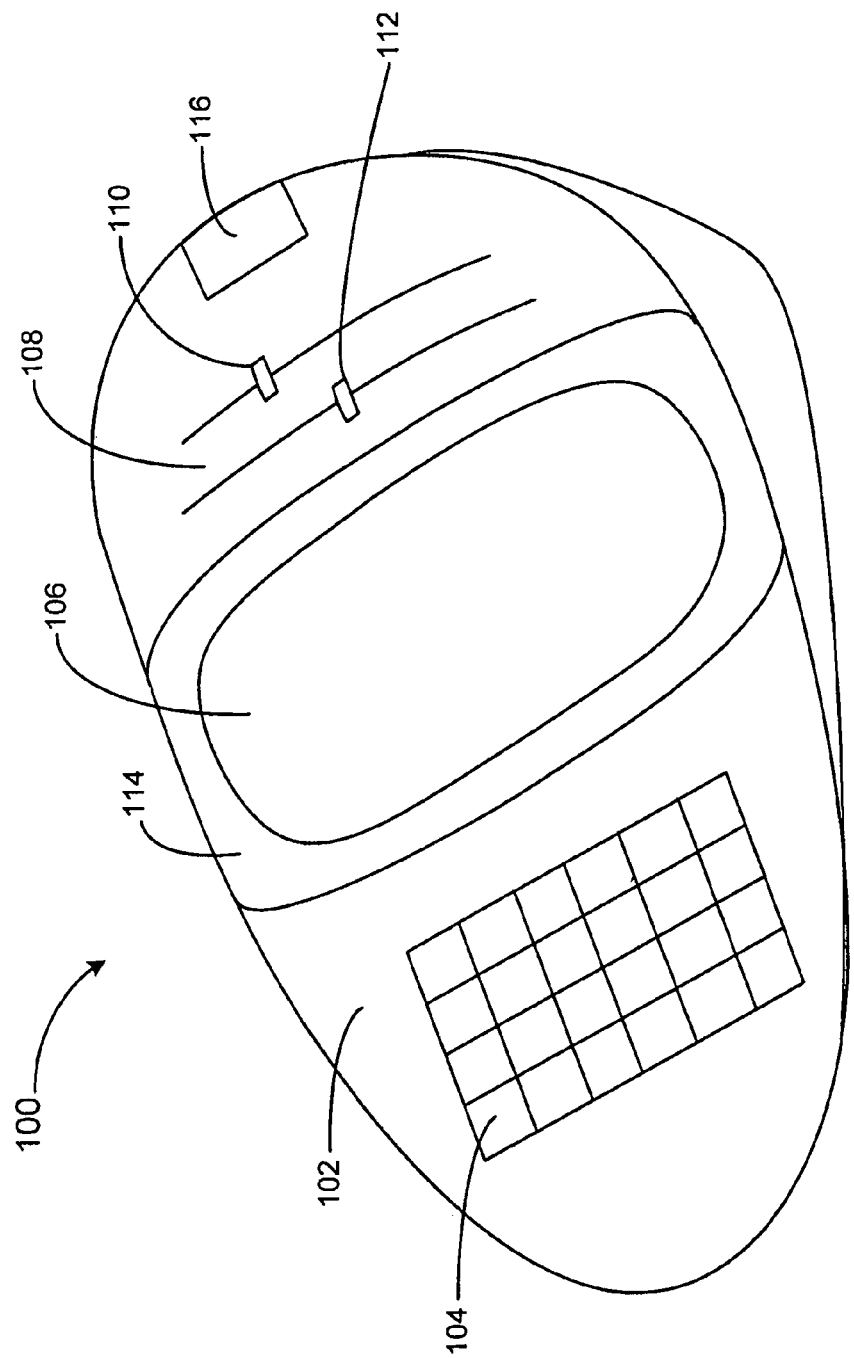
FIG. 1 is a perspective view of an exemplary POS terminal according to one embodiment of the present invention.

The detailed description of exemplary embodiments of the invention herein makes reference to the accompanying drawings, which show exemplary embodiments by way of illustration and the best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the system (and components of the individual operating components of the system) may not be described in detail herein. It should be noted that many alternative or additional functional relationships or physical connections may be present in a practical system.

A point of sale ("POS") terminal according to various embodiments of the present invention includes a transaction instrument reader (e.g., magnetic stripe reader), various electronic circuits for processing a sales transaction, an interactive display for presenting and receiving input of transaction information, a keypad including numeric and function keys, and a housing containing the circuits, display and keypad. The POS terminal may be used with any number of transaction instruments and thus may provide for interchangeable or supplemental transaction instrument interfaces. For example, in one embodiment, a magnetic stripe reader module may be detached from the POS terminal housing and a smart card reader module attached to the housing in its place. Wireless capabilities are also incorporated into the present invention to provide portability. Periphery devices for use with the POS terminal may include printers, additional displays, PIN entry pads, alphanumeric keyboards, voice prompt systems, signature capture devices, bar code reader, and biometric reader. The POS terminal may be a stand alone unit or may be integrated into an electronic cash register ("ECR"), vending machine or a self check-out kiosk and the like.

In an exemplary POS transaction, the POS terminal facilitates payments by extracting account information from a user's transaction instrument (e.g., when a user swipes a credit card), receiving user authentication input, constructing an authorization message, and communicating the authorization message to a payment manager host computer to authorize a sales transaction. As used herein, the term "user" includes a consumer, cardholder, merchant, and merchant temporarily in possession of a consumer's transaction card. Cardholder authentication may be accomplished using a PIN number, signature, voice command, biometric input, encrypted transaction instrument data, or any other suitable input. The host computer performs normal authorization procedures and returns one of an authorization and a rejection message. In performing an "on-line" transaction, after the transaction is consummated, the POS terminal communicates the relevant details of the transaction to be stored on the payment manager host computer. While in performing an "off-Line" transaction the terminal may approve or decline based on tables or card date, and later forward transaction data to the payment manager host computer. The POS terminal further communicates with the payment manager host computer to reconcile accounts at the end of a predetermined business cycle (e.g., at the end of each day). Communications between the POS terminal and a host computer may be conducted over any suitable network now known or later developed. As used herein, the term "network" shall include any electronic communications means which incorporates both hardware and software components of such. Exemplary networks or communication channels include a telephone network, an extranet, an intranet, Internet, online communications, satellite communications, off-line communications, wireless communications, transponder communications, local area network (LAN), wide area network (WAN), networked or linked devices, and/or any suitable communication or data input modality.

Referring now to FIG. 1, an exemplary embodiment of the invention is illustrated including a POS terminal 100 having a housing 102, a key pad 104, an interactive display 106, a card track 108, a first magnetic stripe reader head 110, and a second magnetic stripe reader head 112. Housing 102 houses various components of POS terminal 100 including basic components not shown here, such as a power supply circuit, internal clock, microcontroller or microprocessor, ROM, RAM, lights, and other suitable hardware for communicating with a host computer, and inputting, processing, transferring or displaying transaction data.

Housing 102 includes card track 108 formed therein and houses reader heads 110 and/or 112 positioned along track 108. Track 108 includes two sidewalls for guiding a user's transaction card drawn past reader heads 110 and/or 112 to facilitate extraction of card data from a magnetic stripe on the card. Reader heads 110 and 112 are positioned along opposite sidewalls of card track 108. The invention contemplates any orientation or placement of magnetic heads 110 and 112 that facilitates reading of a magnetic stripe on a card in at least two different orientations. For example, reader heads 110 and/or 112 need not be positioned in or along a track, but may, instead, be positioned with reference to any suitable card positioning feature such as a ledge, pin, slot, or the like. Reader heads 110 and 112 are offset from one another along the length of card track 108. Offsetting reader heads 110 and 112 along card track 108 reduces field interference and/or enables a user to more smoothly draw a card through card track 108. Reader heads 110 and 112 may be directly opposed in alternative embodiments.

Reader heads 110 and 112 may be positioned so as to protrude from, be flush-mounted with, or be recessed into the sidewalls of card track 108. Similarly, card track 108 need not include sidewalls, but may include, instead, any feature suitable for guiding a card past reader heads 110 and 112. Exemplary alternative card track features include a slot, ledge, pin, tab, projection, recess, and the like. A mechanical feed or feed-return device may be used to automatically draw a card inserted into card track 108 past reader heads 110 and/or 112.

A magnetic stripe reader circuit associated with reader heads 110 and 112 facilitates bi-directional reading of magnetic stripe data, for example, by transposing captured data when necessary to obtain a proper sequence of account information. Bi-directional reading of transaction cards provides increased convenience by allowing POS terminal users to swipe a card without regard to a particular direction. Reader heads 110 and 112 may be connected to the magnetic stripe reader in parallel to the same decoder. Alternatively, reader heads 110 and 112 may be individually coupled to separate decoders to facilitate simultaneous data extraction from both sides of a magnetic stripe card.

Reader heads 110 and/or 112 may be configured to read single or multiple tracks within a magnetic stripe. For example, each of reader heads 110 and 112 may comprise a stack of two or more associated heads for reading multiple tracks, e.g., one track containing user identification and another containing account information. Individual tracks may be coupled separately or in parallel to decoder circuits to facilitate multiple orientations as well as reading of multiple stripe tracks located on opposing sides of a card in multiple orientations.

Figure 2:
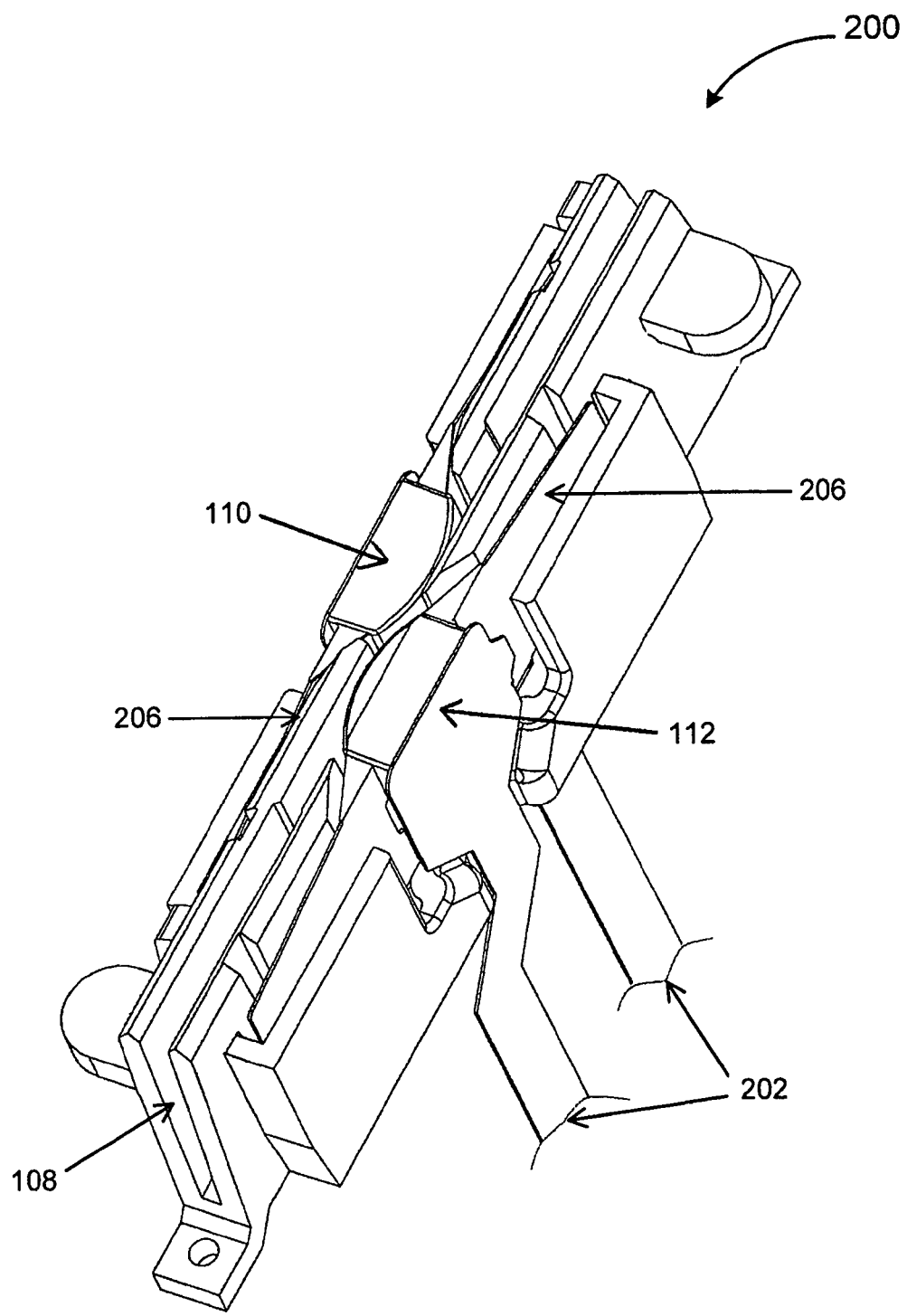
FIG. 2 is a perspective view of an exemplary dual magnetic reader head assembly.

FIG. 2 illustrates an exemplary dual magnetic head assembly 200, including reader heads 110 and 112 positioned along track 108. Reader heads 110 and 112 are coupled to at least one decoder circuit by means of electric terminals 202. Coupling of reader heads 100 and 112 to at least one decoder circuit may further be by means of socket interface 120 shown in FIG. 3 and socket 16. At least one of reader heads 110 and 112 may be biased towards the center of track 108 by spring members 206. Biasing by spring members 206 serves to maintain close proximity or contact between a card stripe and reader head 110 or 112 while a card is passed along track 108. Spring members 206 may also serve to align cards within track 108 by initially yielding to accommodate misaligned cards. Biasing of reader heads 110 and 112 may be accomplished by any means now known or later developed in the art. Alternatively, heads 110 and/or 112 may rigidly secured along a narrowed track 108.

Through experimentation, it was found that an offset of between 2 mm and 5 mm between the centers of reader heads 110 and 112 along track 108 provides for reduced field interference and/or card chatter. Directly opposing reader heads may potentially cause field interference. Offsetting reader heads 110 and 112 by more than 7 mm tends to increase the likelihood of card chatter during reading by a first head as the leading edge of the card engages a second head. Thus, it was found that offsetting reader heads 110 and 112 equal to or less than the length of the unused portion of the magnetic stripe, typically 5 mm, ensured that a card was in contact with both reader heads 110 and 112 prior to extraction of data by either head.

In one embodiment, housing 102 includes a removable faceplate 114 adjacent at least portions of display 106 and/or keypad 104. In various other embodiments, faceplate 114 is integral with housing 102. Removable faceplate 114 may be personalized or decorated to correspond with a merchant's branding (e.g., trademark) or marketing events (e.g., sales). Exemplary decorations include logos, slogan, colors, or other marketing useful in reinforcing customer branding impressions. Removable faceplate 114 is suitably configured to be easily removed and/or replaced when it becomes worn or soiled through use. In embodiments in which keypad 104 is electronically presented on display 106, removable faceplate 114 may comprise a bezel surrounding display 106.

Housing 102 further includes a socket 116 for connecting additional transaction data extraction devices such as a smart card reader, bar code scanner or other types of peripheral devices. Socket 116 includes a pin bar or contact strip type electrical interface or may include any other suitable connection or interface now known or later developed in the art. Thus, modular or peripheral devices may be connected to housing 102 with socket 116. Socket 116 may also be used to simply associate a device physically with housing 102, for example, where a device includes wireless communication capabilities. Exemplary modular peripheral devices include smart card readers, contactless transaction instrument readers, radio frequency readers, infrared and wireless communications devices, supplemental magnetic stripe readers, PIN keypads, bar code scanners, printers, modems, telephone handsets, biometric scanners, voice command input devices and the like. Similarly, any peripheral device or capability now known or later developed may be integrated into or associated with POS terminal 100. Additionally, housing 102 may include features such as a latch, clip, or slot to facilitate tabletop, pedestal or stand mounting.

Keypad 104 comprises an alphanumeric keypad including keys numbered zero through nine for entry of PIN numbers. Keypad 104 may also include any number of function keys, such as, for example, keys for canceling a transaction, specifying the type of transaction instrument, selecting whether to print a receipt, confirming a charge amount, or for any other relevant feature. Alphanumeric and/or function keys on keypad 104 may be separately movable as with a conventional keyboard, or may be displayed on an interactive surface that responds to pressure, static, or any other suitable user input or action. In a preferred embodiment, keypad 104 is integrated into interactive display 106 as a series of on-screen interactive icons. Exemplary function keys or icons include: cancel, enter, clear, print, reset, power, debit, credit, cash back, additional transaction selection, preset dollar amounts for cash back, and the like.

With continued reference to the embodiment shown in FIG. 1, interactive display 106 serves to display transaction information and with an optional touch screen, may also receive user input such as a customer's signature. Various embodiments include electronic signature capture, enabling user's to electronically authorize a transaction by passing a stylus or pen over the display much the same as signing a conventional paper receipt. Replaceable screen protectors protect display 106 from wear by the stylus. Display 106 may present advertising or interactive messages such flashing or moving messages notifying users of merchant membership programs, sales, upcoming events and the like. In alternative embodiments, display 106 is not interactive but merely displays transaction data while providing no signature capture, interactive icons or other on-screen user input capabilities. In additional alternative embodiments, POS terminal 100 does not include any type of display 106, for example, when POS terminal 100 is coupled to a cash register including a display. Alternatively, a stand alone POS terminal 100 need not have any form of display 106 to facilitate a transaction.

Figure 3:
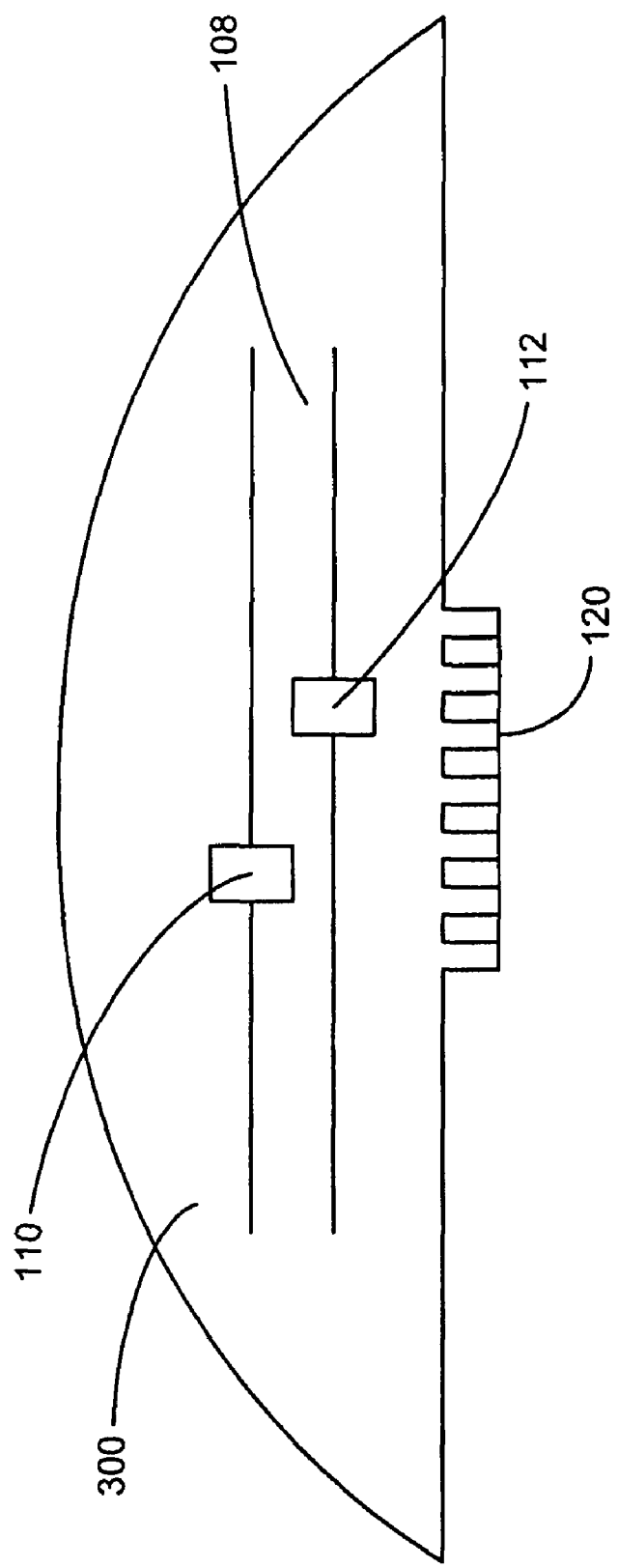
FIG. 3 is a top view of an exemplary magnetic stripe reader modular unit for use with a POS terminal according to another embodiment of the present invention.

FIG. 3 illustrates an exemplary dual-head magnetic stripe reader module 300 for use with a modular embodiment of the POS terminal shown in FIG. 1. Magnetic stripe reader module 300 includes a card track 108 for dynamically receiving a transaction card and reader heads 110 and 112 for dynamically reading a magnetic stripe on the transaction card. Magnetic stripe reader module 300 further includes a socket interface 120 for coupling with a socket on a POS terminal. As discussed earlier, any number of POS terminal sockets, interfaces, or connections may be used to associate a magnetic stripe reader module, smart card module, stored money card module, or any other modular or peripheral device with the POS terminal. While various readers, authentication devices, scanners, etc, may be described herein as modules, it is understood that such devices may likewise be integrated into or otherwise associated with the POS terminal.

In one embodiment of the invention, a micro-processor disposed in POS terminal 100 and associated programming modules support simultaneous processing of data in two different software applications or in two separate transactions. This multi-thread or multi-application functionality enables POS terminal users to conduct a second concurrent transaction without having to wait for completion of an earlier submitted transaction. For example, a user may conduct a loyalty program transaction concurrent with a credit card transaction. Such multi-thread processing is advantageous, for example, when a user desires to pay for an item using a mixture of loyalty program points and credit or debit charges. Concurrent transaction processing is similarly advantageous in performing concurrent credits/returns and new purchases, concurrent purchases and loyalty program credits, concurrent age and/or identity verification and check cashing, concurrent purchases and program enrollments, or concurrent purchases and rebate processing. An exemplary POS terminal may also support multiple applications, that is two or more separate applications may exist on the terminal, and may be invoked manually by selection, for example, from a base menu, or automatically based on input card data. In other words, various embodiments of POS terminal 100 support multiple concurrent applications or transactions, and/or multiple asynchronous applications or transactions invoked either manually or automatically.

The POS terminal facilitates concurrent transactions by establishing multiple communication channels or multiple dialogues over a single channel with distinct applications or systems and by simultaneously communicating or processing transaction information and user inputs to the distinct applications or systems. For example, a combined charge card/loyalty card may include stored data to prompt the POS terminal to communicate transaction information to both the charge account host system and the loyalty program host systems. A user's PIN entry may likewise be submitted to both host systems to provide user authentication. This enables loyalty programs to be more flexible and responsive in offering program benefits to members.

One embodiment of the invention supports age and identity verification by extracting user data from a user's transaction instrument, requesting authentication input, and verifying the user data and authentication input with user data stored on the host system of the transaction instrument issuer. Age and identity verification may likewise be performed using any appropriate transaction instrument data, host system data or user supplied data.

One embodiment of the invention supports payroll check and government check reading and/or cashing. For example, the POS terminal facilitates the capture of routing and account numbers, and any other relevant information from bar codes or other machine readable indicia printed or otherwise accessible on such checks. Thus, a consumer may present such checks for immediate electronic verification and drawing of funds from the check issuer's account for use in payment at a POS terminal. In embodiments that include a cash return device, a consumer may receive any remaining balance of the check value as cash.

In one embodiment of the invention, IP and/or USB ports enable connectivity of the POS terminal with a keyboard, personal computer, or with additional POS terminals. Additionally, the POS terminal may support both Ethernet and modem connectivity capabilities. Redundant communications connectivity capabilities serve to reduce or eliminate the impact of temporary network failures by automatically reestablishing communications with a host system using a backup communications channel. For example, if a local interne network hub fails, the POS automatically dials the appropriate host system using a back-up modem. Additional wireless communication capabilities enable portable use of the POS terminal. For example, a salesperson may carry a wireless POS terminal on his or her belt for assisting customer's with showroom purchases without the need to relocate to a cashier's desk Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." Further, no element described herein is required for the practice of the invention unless expressly described as "essential" or "critical."

What is claimed is:

1. A point-of-sale terminal comprising:
   electronic transaction circuits;
   a housing for said electronic transaction circuits;
   a card swipe track associated with said housing, for dynamically orienting a transaction card having a magnetic stripe on at least one of a first face and a second face of said card;
   a first magnetic stripe reader head disposed along said track for reading said magnetic stripe on said first face of said card;
   at least a second magnetic stripe reader head disposed along said track, wherein said second magnetic stripe reader head is opposite and laterally offset from said first magnetic stripe reader head for reading said magnetic stripe on said second face of said card; and
   wherein said electronic transaction circuits are configured to facilitate multiple simultaneous transactions through said point of sale terminal, said multiple simultaneous transactions comprising at least two of a credit account transaction, debit account transaction, checking account transaction, loyalty account transaction, rebate processing, refund processing, age verification, identity verification, concurrent purchase, and program enrollment.

2. The point of sale terminal of claim 1, wherein said at least a second magnetic stripe reader head is longitudinally offset along said track from said first magnetic stripe reader head.

3. The point of sale terminal of claim 2, wherein said at least a second magnetic stripe reader head is longitudinally offset from said first magnetic stripe reader head a distance of between 1 and 7 millimeters.

4. The point of sale terminal of claim 2, wherein said at least a second magnetic stripe reader head is longitudinally offset from said first magnetic stripe reader head a distance of between 2 and 5 millimeters.

5. The point of sale terminal of claim 1, wherein at least one of said first and said at least a second magnetic stripe reader head facilitates bi-directional reading of a card drawn along said track.

6. The point of sale terminal of claim 1, wherein said track comprises at least one of a slot, ledge, projection, recess and said at least a first magnetic stripe reader head.

7. The point of sale terminal of claim 1, further comprising:
   at least one of a smart card interface, contactless antenna circuit reader, radio frequency receiver, infrared receiver, bar code reader, and biometric reader.

8. An improved point of sale terminal, wherein the improvement comprises:
   a first magnetic stripe reader head;
   at least a second magnetic stripe reader head positioned opposite and laterally offset from said first magnetic stripe reader head along a card swipe track to facilitate the extraction of data from a transaction card in multiple card orientations; and
   electronic transaction circuits configured to facilitate multiple simultaneous transactions through said point of sale terminal, said multiple simultaneous transactions comprising at least two of a credit account transaction, debit account transaction, checking account transaction, loyalty account transaction, rebate processing, refund processing, age verification, identity verification, concurrent purchase, and program enrollment.

9. The improved point of sale terminal of claim 8, wherein said at least a second magnetic stripe reader head is longitudinally offset from said first magnetic stripe reader head along said card swipe track.

10. The point of sale terminal of claim 9, wherein said at least a second magnetic stripe reader head is longitudinally offset from said first magnetic stripe reader head a distance of between 1 and 7 millimeters.

11. The point of sale terminal of claim 9, wherein said at least a second magnetic stripe reader head is longitudinally offset from said first magnetic stripe reader head a distance of between 2 and 5 millimeters.

12. A method of extracting financial transaction information at a point of sale terminal, said method comprising:
   providing a first magnetic stripe reader head and at least a second magnetic stripe reader head opposite and laterally offset from said first magnetic stripe reader head;
   providing a card swipe track to facilitate drawing a magnetic stripe on a transaction card past at least one of said first magnetic stripe reader head and said at least a second magnetic stripe reader head;

receiving said transaction card drawn along said card swipe track;

extracting account information from said transaction card; and processing multiple simultaneous transactions through said point of sale terminal, said multiple simultaneous transactions comprising at least two of a credit account transaction, debit account transaction, checking account transaction, loyalty account transaction, rebate processing, refund processing, age verification, identity verification, concurrent purchase, and program enrollment.

13. The method of claim 12, wherein said step of extracting account information from said transaction card is performed independent of the direction of travel of said transaction card within said card swipe track.

14. The method of claim 12, wherein the step of receiving said transaction card drawn along said card swipe track comprises mechanically drawing said transaction card along said card swipe track.

* * * * *